United States Patent [19]

Chang

[11] Patent Number: 4,591,698

[45] Date of Patent: May 27, 1986

[54] ELECTRIC DUAL AND QUICK COOKING UTENSIL

[76] Inventor: Hong-Tsuan Chang, 83, Sec. 2, Lin-Shen Road, Tainan, Taiwan

[21] Appl. No.: 588,458

[22] Filed: Mar. 12, 1984

[51] Int. Cl.$^4$ .............................................. F24C 7/00
[52] U.S. Cl. ..................................... 219/400; 219/386; 219/432; 219/434; 219/442
[58] Field of Search ............... 219/400, 386, 387, 393, 219/450, 516, 432, 433, 441, 442; 335/205

[56] References Cited

U.S. PATENT DOCUMENTS

| | | | |
|---|---|---|---|
| 1,943,575 | 1/1934 | Abendroth | 219/400 |
| 2,187,888 | 1/1940 | Nachumsohn | 219/406 |
| 2,235,911 | 3/1941 | Wilcox | 219/441 |
| 2,675,458 | 4/1954 | Stiles | 99/331 |
| 3,627,959 | 12/1971 | Chapell | 335/205 |
| 3,852,692 | 12/1974 | Moorman | 335/205 |
| 4,190,965 | 3/1980 | Erickson | 219/400 |
| 4,350,874 | 9/1982 | Nishikawa | 219/400 |
| 4,399,351 | 8/1983 | Koff | 219/433 |

FOREIGN PATENT DOCUMENTS 1231827  1/1967  Fed. Rep. of Germany ...... 219/450

OTHER PUBLICATIONS

Onishi, Masayuki, "Oven-Cooking Type...", Toshiba Review, Japanese Ed., vol. 35, No. 5, 1980, pp. 1-15.

Primary Examiner—C. L. Albritton
Assistant Examiner—Teresa J. Walberg
Attorney, Agent, or Firm—Birch, Stewart, Kolasch & Birch

[57] ABSTRACT

An electric dual and quick cooking utensil includes, as usual, an outer casing, an inner pot movably provided in the outer casing, and a hood detachably coupled with the upper rim of the outer casing with respect to the inner pot. In addition to a grip and a plurality of air vents integrally formed thereto, the hood includes a metal hub, a hollow pipe, and a first heater respectively installed therein for baking operation. A pair of magnetic-type switches separately installed on the hood and the outer casing for providing power supply to the first heater. A hollow base is integrally coupled with the lower portion of the outer casing with a plurality of plates separately provided in the upper portion of the hollow base. A second heater and a blowing fan are respectively disposed on the plates, and a sensing device coupled with an IC board is installed in a round plate in conjunction with the inner pot. A selective switch electrically connected to the contact switches, the second heater, the IC board and a retractable power plug is installed on the upper outer side wall of the base, thereby, cooking or baking can be conveniently set at any time for safe operations.

3 Claims, 4 Drawing Figures

ELECTRIC DUAL AND QUICK COOKING UTENSIL

BACKGROUND OF THE INVENTION

This invention relates to an electric dual and quick cooking utensil for all-purpose food preparing operations.

DESCRIPTION OF BACKGROUND ART

Conventionally, the electric cooking utensils are usually made in separate units, such as an electric pot used only for cooking or stewing water-based food, and an electric oven used only for baking or roasting purpose. A well known electric oven produced by Japanese Imanisi Metal Industrial Co. Ltd. is shown in FIG. 1, which electric oven includes: a base support 1 having projecting portions 4 at the four corners and matched with pads 5 for supporting the oven body; an open outer casing 9 having a baking chamber 25 formed therein closely coupled with the base support 1; a baking grid 6 arranged in the baking chamber 25; an isolating case 13 having a filter member 24 provided in the middle closely disposed on the upper inner wall of the outer casing 9; a pair of hand grips 10 symmetrically provided at the upper side of the outer casing 9; a reflecting plate 16 installed in the top portion of the outer casing 9 in defining a radiation room 17 in the upper portion and a heating room 18 in the lower portion thereof; a heater 23 installed in the heating room 18; a blowing fan 21 provided in the radiation room 17; a turbine fan 22 coupled with the blowing fan in the heating room 18; a motor housing 18' provided on the top cover of the outer casing 9; and a motor 19 having a suspension shaft 20, to which the blowing fan 21 is connected, installed in the motor housing 18'. When the motor 19 is in rotation, the heat produced by the heater 23 will be driven into the baking chamber 25 through the filter member 24 by the turbine fan 22 aong with the blowing fan 21, which is used to blow out the heat in the radiation room 17 via the air vent 26 for preventing the top portion of the outer casing 9 from being overheated. Problems suffered by this known electric oven are that (1) food preparation can be made only for baking operation through the hot air circulation in the baking chamber 25; (2) as the motor and the blowing fan are all installed in the top portion of the cover of the outer casing 9, it is inconvenient to operate the cover during food preparing operation; and (3) some lubricant oil from the motor 19 may drip down and contaminate the food therein.

SUMMARY OF THE INVENTION

It is accordingly a primary object of this invention to provide an electric dual and quick cooking utensil for improving the known electric oven and overcoming the problems associated with the prior art.

According to the present invention, this and other objects are achieved by providing an electric dual and quick cooking utensil which includes, as usual, an open outer casing, an open inner pot movably provided in the outer casing, and a hood detachably coupled with the upper portion of the outer casing. In addition to a hand grip and a plurality of air vents integrally formed thereto, the hood includes a metal hub, a hollow pipe, and a first heater respectively installed within the inner side thereof for baking purpose. A pair of magnetic-type switches separately installed on the hood and the outer casing for providing power supply to the heater thereof. A hollow base is integrally coupled with the lowerr portion of the outer casing with a plurality of plates separately provided in the upper portion of the hollow base. A second heater and a blowing fan are respectively disposed on the plates, and a sensing device coupled with the IC board is installed in a round plate in conjunction with the inner pot and the second heater in the base. A selective switch having a plurality of selective positions electrically connected to the contact switches, the second heater, the IC board and a retractable power plug is installed on the upper outside wall of the base; so that, cooking and baking can be conveniently set at any time for safe operations.

Other characteristics and advantages of this invention will become apparent to those skilled in the art from the following detailed description of a preferred embodiment when read in conjunction with the accompanying drawings.

DETAILED DESCRIPTION OF THE PREFERRED EMBODIMENT

Figure 1:
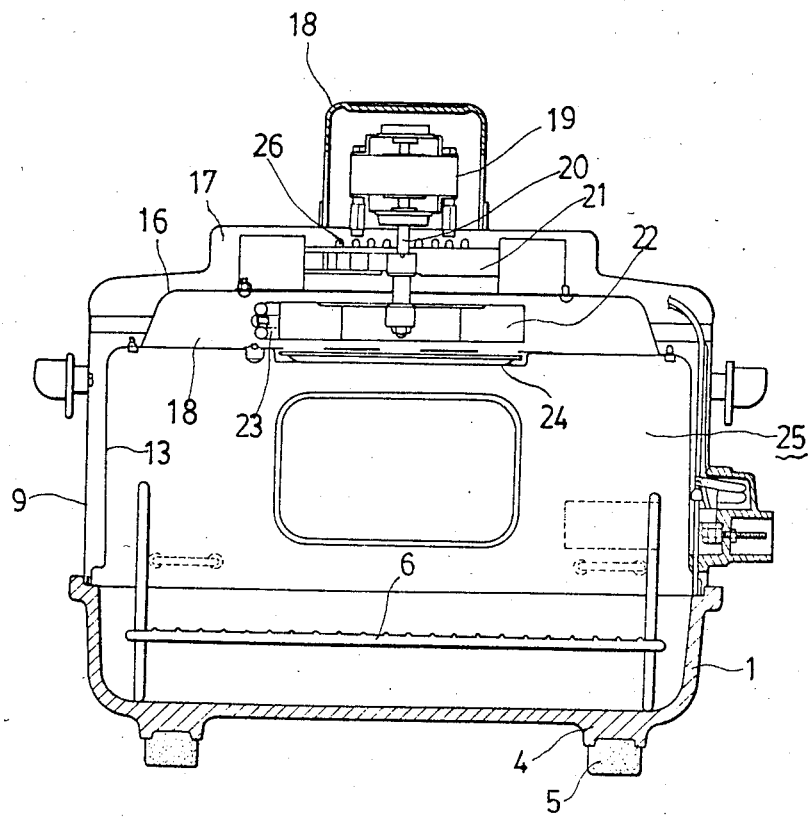
FIG. 1 is a sectional view of a known electric oven.
Figure 2:
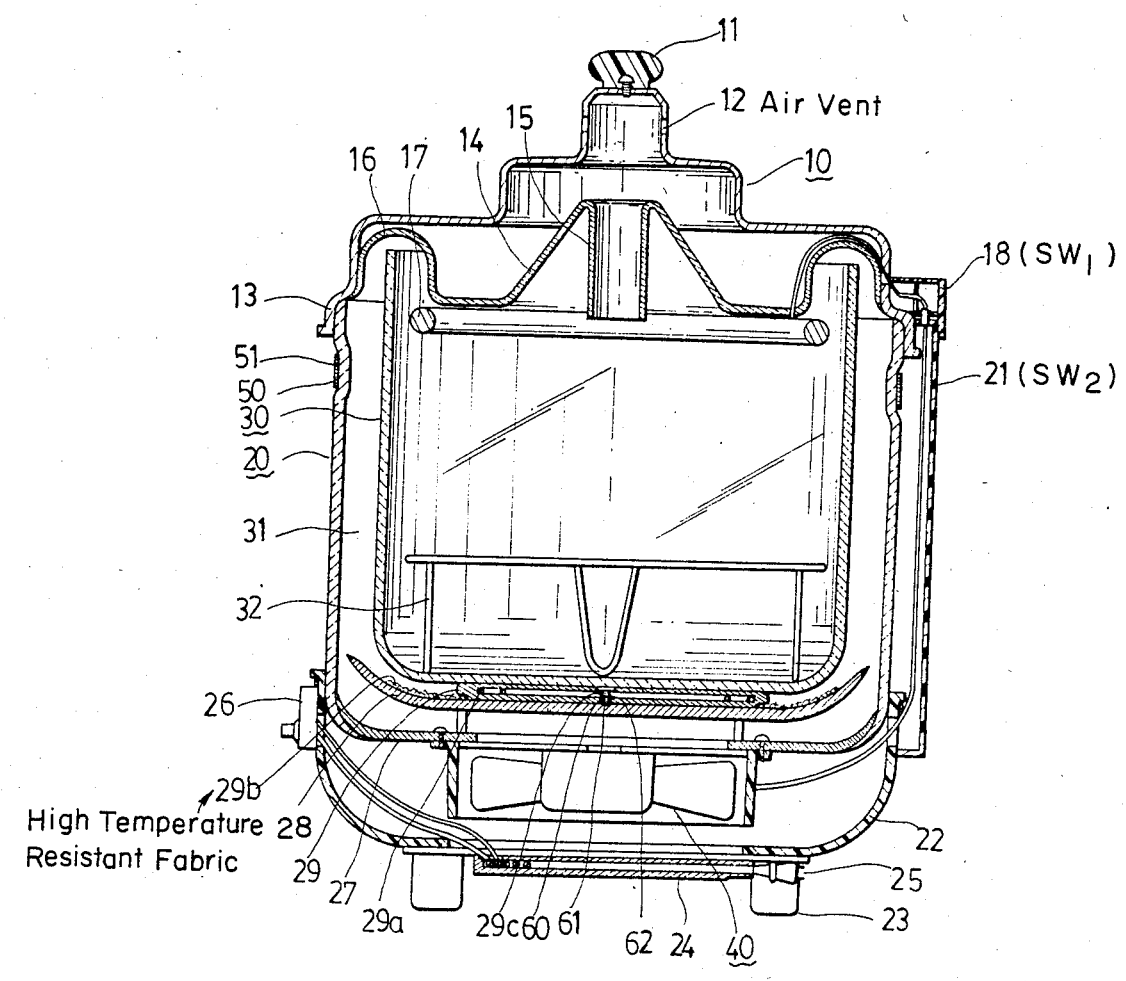
FIG. 2 is a sectional view of a preferred embodiment of an electric dual and quick cooking utensil according to this invention.

Referring to FIG. 2, there is shown a preferred embodiment of an electric dual and quick cooking utensil according to this invention, which utensil includes, as usual, a hood 10, an outer casing 20, and an inner pot 30. The hood 10 is formed in a gradual grade shape and includes a grip 11 at the top end, a plurality of air vents 12 in the lower portion below the grip 11, and a projecting flange 13 around the periphery of the lower edge of the hood 10 for being movably coupled with the top rim of the outer casing 20. An inner hub 14 of stainless steel lined within the hood 10 with a hollow round pipe 15 fixed in the middle space between the outer casing 20 and the inner pot 30, and a first heater 17 provided under the lower portion of the inner hub 14 and electrically connected to a first contact switch $SW_1$ installed on the outer wall of the hood 10. The outer casing 20 is made of transparent glass of high-temperature resistance and includes: a second contact switch $SW_2$ installed on the outer wall adjacent to the first switch $SW_1$; a plastic base 22 integrally coupled with the outer casing 20 with a plurality of base supports 23 separately provided at the bottom side; a blowing fan 40 disposed in the space defined between the base 22 and the lower part of the outer casing 20; a power line disk 24 fixed on the bottom center of the base 22 with a retractable power plug 25 movably installed therein; and a selective switch 26 provided on the upper side wall of the base 22, which switch 26 is of a rotary type with a plurality of functional contacts such as "HIGH", "LOW", and "DOUBLE" provided therein for serving multiple cooking purposes. A hollow base plate 27 is rigidly fixed under the bottom side of the outer casing 20 surrounding the blowing fan 40 therein, and a supporting disk 28 is disposed over the top area of the base plate 27 with the bottom side spacingly fastened on the top surface of the base plate 27. A round plate 29 is separately screw-connected to the upper center of the supporting disk 28 with a second heater 29a provided therein and a layer of fabric material of high-temperature resistance 29b is lined between the round plate 29 and the supporting disk 28.

The inner pot 30 within the outer casing 20 is movably rested on the top surface of the round plate 29 with an air circulating passage 31 formed between the outer periphery of the inner pot 30 and the inner wall of the outer casing 20, and a baking grid 32 is removably placed in the inner pot 30 for preparing baked foods such as beef, chicken, etc.

The round plate 29 is provided with an aperture 29c, and a sensing device 60 is installed in the aperture 29c. The sensing device 60 includes a sensing rod 61 made of copper, and a spring 62 sleeved around the sensing rod 61 of which one end is kept in close contact with the bottom side of the inner pot 30 and the other is coupled with an IC board (not shown) disposed on the inner wall of the base 22 functionally connected to the selective switch 26 for temperature sensing and automatic power cut-off action.

Figure 3:
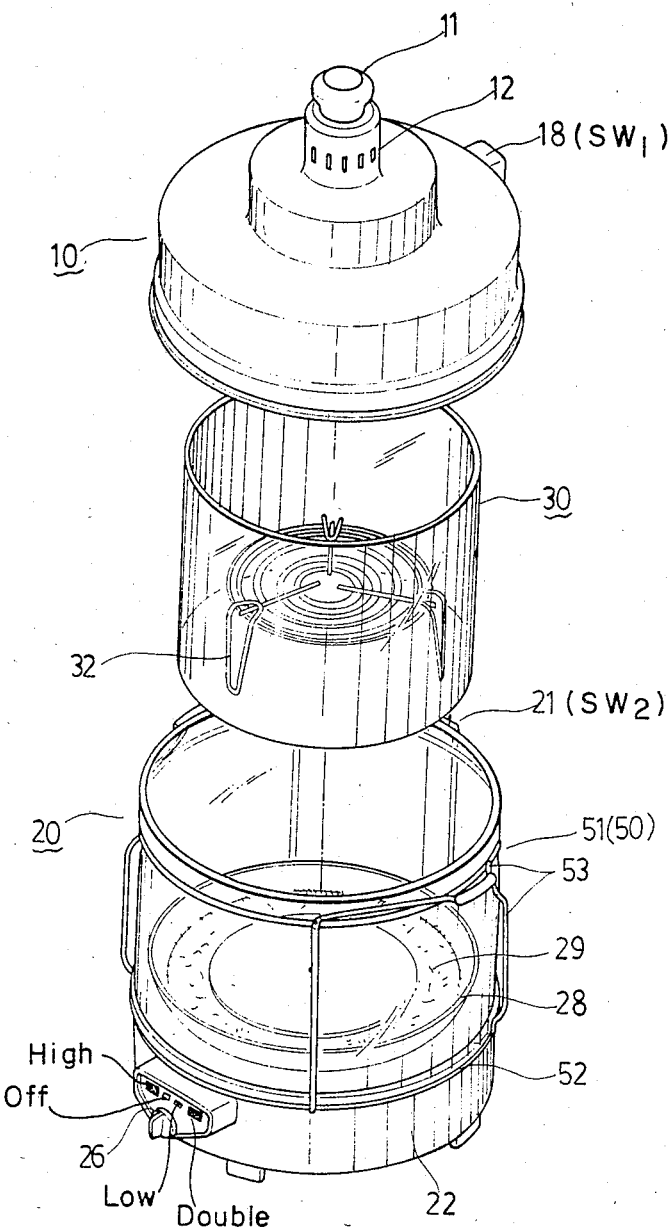
FIG. 3 is a general exploded view of the preferred embodiment shown in FIG. 2.

Referring to FIG. 3, the outer casing 20 includes a groove 50 around the upper edge, and a metal strap 51 made of stainless steel is installed in the groove 50. A same metal strap 52 is also provided around the upper portion of the base 22, and a pair of hand grips 53 are rigidly fixed between the metal straps 51 and 52 for manual handling of this dual cooking utensil.

The two contact switches $SW_1$ and $SW_2$ respectively provided on the hood 10 and the outer casing 20 are of a magnetic type for effecting electrical connection between the two contact switches, which are controlled by the selective switch 26 for supplying the required power to the first heater 17 which is electrically connected to the first contact switch $SW_1$. Therefore, when the hood 10 is closed over the outer casing 20, and the selective switch 26 is set at "HIGH" position, the heater 17 will be powered thereat, while when the hood 10 is taken off from the outer casing 20, the electric power of heater 17 will be automatically cut off from the power source thereof even the switch 26 remains at the "HIGH" position. Besides, when the selective switch 26 is set at "LOW" position for cooking or stewing purpose, only the second heater 29a under the inner pot 30 is powered without electric power being supplied to the heater 17 even the hood 10 is kept in closed position with the outer casing 20. But, when the selective switch 26 is set at "DOUBLE" position, both the first heater 17 and the second heater 26 are simultaneously powered for baking purpose. It shall be appreciated that the blowing fan 40 is also electrically connected to the selective switch 26 at the "HIGH" and "DOUBLE" positions respectively. Therefore, whenever the switch 26 is set either at "HIGH" or at "DOUBLE" position, the blowing fan will be operated to make the hot air (around 200° C.) circulating in passage 31 between the inner pot 30 and the outer casing 20. As the wiring and arrangement of the two contact switches $SW_1$, $SW_2$, and the selective switch 26 as well as the blowing fan 40 are a known art, description and illustration are omitted for clarity.

Figure 4:
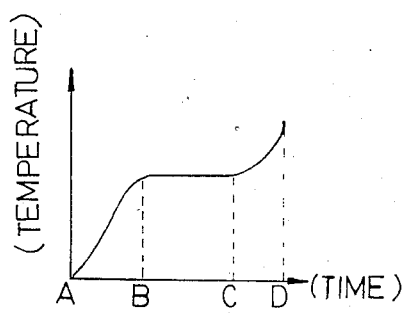
FIG. 4 is a T-t (temperature and time) diagram of the inner pot of the preferred embodiment shown in FIG. 2.

According to the experiment made by this inventor, the inner pot 30 is preferably made of Pyrex-11 glass of high-temperature resistance for cooking as well as for baking purposes. For example, if the inner pot 30 is used to cook rice with the selective switch 26 set at "LOW" position, the performance of the inner pot 30 is as shown in FIG. 4. When the temperature increases from A to B through the second heater 29a, the temperature of the inner pot 30 changes as shown by the curve of the drawing. When the temperature continues to increase through the heater 29a, the temperature of the inner pot 30 will remain at a level condition between B and C. However, when the water within the inner pot 30 is dried up, the temperature of the inner pot 30 will rapidly rise up from C to D. Meanwhile, as the temperature on the bottom and the side wall of the inner pot 30 is different, owing to the different expansion thereof, the lower portion of the inner pot 30 may burst therein. It is for this reason, the sensing device 60 is installed under the bottom side of the inner pot 30 so as to prevent it from becoming too hot and bursting thereat. As the sensing rod 61 is kept in close contact with the bottom side of the inner pot 30 through the expansion force of the spring 62 (as shown in FIG. 2) at one end and connected to the IC board (not shown) at the other, the temperature of the inner pot 30 will be always sensed by the sensing rod 61 and transmitted to the IC board, which, when the temperature signal reaches at a certain point, will immediately effect the cut off of the power from the heater 29a; therefore, the inner pot 30 is always safe for any cooking purposes. On the other hand, in order to prevent the sensing rod 61 from being affected by the heater 29a, a heat isolating material such as glass fiber is disposed between the heater 29a and the sensing rod 61. (Actually, the round plate 29 on which the heater 29a is installed is made of ceramic material 29b and a heat isolating material is also disposed under the heater 29a.) Consequently, the sensing rod 61 can only be sensitive to the heat of the inner pot 30 for ensuring the safety thereof.

In addition, a timing device can also be installed in the IC board for providing timing operation in cooking. As this is also a known art, details are omitted.

For baking operation, the baking grid 32 is placed within the inner pot 30 (as show in FIG. 2), and the food to be baked is put on it. Under this condition, the selective switch 26 is set at a "HIGH" position for turning on the first heater 17 within the hood 10. In the meantime, the blowing fan 40 will blow the hot air (around 200° C.) around the inner pot 30 for baking operation with the rest hot air coming out of the air vents 12 below the grip 11 until the baking action is completed therewith. If the food to be baked or stewed therein requires quick and high temperature, the selective switch 26 is set at a "DOUBLE" position so that both the first heater 17 and the second heater 29a as well as the blowing fan 40 are all turned on for accomplishing the baking or stewing operation. In any case, the sensing device 60 is always performing its function to ensure safe cooking and baking operations therewith.

Certain modifications and improvements will occur to those skilled in the art upon reading the foregoing. It should be understood that all such modifications and improvements have been deleted herein for the sake of conciseness and readability but are properly within the scope of the depending claims.

What is claimed is:

1. An electric dual and quick cooking utensil having an open outer casing, an open inner pot movably provided in the outer casing, a hollow base integrally coupled with a lower portion of the outer casing, and a hood having a hand grip and a plurality of air vents detachably coupled with an upper edge of the outer casing, comprising:

a first contact switch of magnetic type installed on a back side of the hood;

an inner hub of stainless steel provided within the hood;

a hollow round pipe fixed in a middle portion of said inner hub;

a first heater disposed under a lower portion of said inner hub and electrically connected to said first contact switch;

a second contact switch of magnetic type installed on an outer wall of the outer casing and located adjacent to said first contact switch;

a hollow base plate rigidly fixed under a bottom side of the outer casing;

a blowing fan installed in a hollow section of said hollow base plate;

a supporting disk spacingly fixed on a top of said hollow base plate;

a round plate of ceramic having an aperture in a center portion separately connected to an upper center of said supporting disk;

a second heater disposed within said round plate;

a sensing device provided within the aperature of said round plate in conjunction with a bottom side of the inner pot;

a layer of fabric material of high-temperature resistance disposed between said round plate and said supporting disk;

a power-line disk provided on a bottom side of the base;

a retractable power plug installed within said power-line disk; and a selective switch having a plurality of function selections electrically connected to said contact switches, said second heater, and said retractable power plug installed on an upper outer side of the base for controlling multiple cooking operations.

2. An electric dual and quick cooking utensil according to claim 1 wherein both the outer casing and the inner pot are made of transparent glass of high-temperature resistance.

3. An electric dual and quick cooking utensil according to claim 1 wherein said sensing device comprises:
a sensing rod made of copper and disposed therein with one end in close contact with the bottom side of the inner pot;

a spring disposed around said sensing rod for keeping it in close contact with the inner pot through expansion force thereof; and a heat isolating material disposed between said sensing rod and said second heater so as to ensure safe cooking operation of the inner pot.

* * * * *